United States Patent
Hohlrieder et al.

(10) Patent No.: US 7,337,548 B2
(45) Date of Patent: Mar. 4, 2008

(54) DEVICE FOR MEASURING THE GEOMETRY OF A WHEEL AXLE OF A MOTOR VEHICLE

(75) Inventors: Michael Hohlrieder, Körle (DE); Holger Reichbott, Morschen (DE); Ralf Lamster, Kassel (DE)

(73) Assignee: A u E Automations-und Einstelltechnik Kassel GmbH, Kassel (DE)

( * ) Notice: Subject to any disclaimer, the term of this patent is extended or adjusted under 35 U.S.C. 154(b) by 165 days.

(21) Appl. No.: 10/557,235

(22) PCT Filed: May 14, 2004

(86) PCT No.: PCT/DE2004/001062

§ 371 (c)(1),
(2), (4) Date: Nov. 17, 2005

(87) PCT Pub. No.: WO2004/104515

PCT Pub. Date: Dec. 2, 2004

(65) Prior Publication Data

US 2007/0011892 A1    Jan. 18, 2007

(30) Foreign Application Priority Data

May 20, 2003    (DE) .............................. 103 22 643

(51) Int. Cl.
*G01B 5/24*    (2006.01)

(52) U.S. Cl. .................................. 33/203.18

(58) Field of Classification Search ................ 33/203, 33/203.18, 203.19, 203.2, 203.21; 269/47, 269/48.1, 51, 151, 216; 901/32, 36, 39

See application file for complete search history.

(56) References Cited

U.S. PATENT DOCUMENTS

| | | | | |
|---|---|---|---|---|
| 3,758,958 A | * | 9/1973 | Jordan | 33/203.18 |
| 4,337,932 A | * | 7/1982 | Dennis et al. | 269/48.1 |
| 4,918,821 A | * | 4/1990 | Bjork | 33/203.18 |
| 5,033,198 A | * | 7/1991 | Hastings | 33/203.18 |
| 5,056,231 A | * | 10/1991 | Alusick et al. | 33/203.19 |
| 5,242,202 A | * | 9/1993 | Ettinger | 33/203.18 |
| 5,311,668 A | * | 5/1994 | Longa et al. | 33/203.18 |
| 6,282,799 B1 | * | 9/2001 | Warkotsch | 33/203 |
| 7,117,603 B1 | * | 10/2006 | Pellegrino | 33/203.18 |
| 2006/0096109 A1 | * | 5/2006 | Corghi | 33/520 |
| 2007/0089306 A1 | * | 4/2007 | Hohlrieder et al. | 33/203.18 |

FOREIGN PATENT DOCUMENTS

EP    1 128 157 B1    2/2001

* cited by examiner

*Primary Examiner*—G. Bradley Bennett
(74) *Attorney, Agent, or Firm*—Thomas R. Vigil

(57) ABSTRACT

The invention relates to a device for measuring the geometry of a wheel axle of a motor vehicle, said device comprising a clamping chuck (56) which is provided with clamping jaws (32, 34, 36) and is used to receive a hub of a wheel axle, and a drive for rotating the clamping chuck (56). In order to increase the measuring precision, the drive is embodied as an electric drive, especially as a servomotor, and both rotatably drives the clamping chuck (56) and actuates the clamping jaws (32, 34, 36) of the clamping chuck (56) in the radial direction. Furthermore, according to the invention, the clamping jaws are radially displaced by means of a link motion with an eccentric plate or a spiral motion with a spiral of Archimedes in such a way as to obtain an automatic lock.

8 Claims, 3 Drawing Sheets

DEVICE FOR MEASURING THE GEOMETRY OF A WHEEL AXLE OF A MOTOR VEHICLE

CROSS-REFERENCE TO RELATED APPLICATIONS

This application claims Priority from German Application No. DE 103 22 643.5 filed on 20. May 2003.

BACKGROUND OF THE INVENTION

DE 103 22 643.5 dated May 20, 2003

FIELD OF THE INVENTION

The present invention relates to a device for measuring the geometry of a wheel axle of a motor vehicle by means of at least one, preferably three, measuring sensors, the wheel axle comprising either a hub or a hub and a brake disk.

DESCRIPTION OF THE PRIOR ART

A device for measuring and adjusting the toe angle and/or camber of an axle of a motor vehicle is known in which the hub of the axle is retained in a clamping chuck. Said clamping chuck is thereby mounted for rotation in a housing which is itself mounted so as to be pivotal about a horizontal axis. The overall device in turn is float-mounted so that the device may be aligned three-dimensionally according to the actual toe angle and/or camber of the axle to be measured. On the rear side of the clamping chuck there is provided an abutment surface against which the respective ones of the measuring sensors may abut in order to measure the geometry of the axle. It should be understood that such a measurement always comprises a certain nonreproducible error since, due to manufacturing tolerances, the surface of measurement is never capable of reproducing exactly the situation at the axle and above all since non accurate clamping of the hub in the clamping chuck also results in measurement errors.

BRIEF SUMMARY OF THE INVENTION

In view thereof, it is the object of the present invention to provide a device for measuring the geometry of wheel axles by means of which the real conditions at the hub and/or brake disk of the axle can be detected more accurately.

As a technical solution to this object the invention proposes to further develop the device mentioned herein above according to the characterizing portion of claim 1. Advantageous embodiments will appear from the subordinate claims.

A device configured in accordance with this technical teaching has the advantage that utilizing an electric drive may allow for example the pneumatic drive known from EP 1 128 157 A 1 to be eliminated. As a result, the need for pneumatic air hoses and other component parts is also obviated so that the entire device can be configured to be much smaller.

This advantage is even further reinforced in that the electric drive is disposed axially centrally behind the clamping chuck and that from there it acts onto the clamping chuck and the clamping jaws. As a result, the drive is disposed outside of the critical zone so that the hub gripper may be configured to be commensurately small.

Another advantage is that it dispenses with the need to guide a fluid into the rotating component parts so that rotary transmission leadthroughs are no longer needed and that possible leakage and other problems are no longer allowed to occur.

Still another advantage is that one single electric drive permits both to impart rotation to the clamping chuck and to actuate the clamping jaws. Thus, the entire hub gripper can be driven using but one single electric motor, which further contributes to reducing the overall size.

In a preferred embodiment, an electric coupling is utilized, said coupling switching between grasping and rotational movement and also being actuated by the electric drive. This also contributes to reducing the overall size.

In a particularly preferred embodiment, the clamping jaws are moved radially through a link motion control unit which in turn is actuatable through the electric drive. Utilizing this link motion control unit allows the clamping jaws to exert corresponding forces onto the component part to be retained and a small and compact construction of same. It has been found advantageous to configure the link motion control unit to be self-locking.

In another also preferred embodiment, the clamping jaws are caused to move radially through a spiral motion control unit that is also actuatable via the electric drive. Utilizing said spiral motion control unit permits guiding the clamping jaws with less friction so that they are prevented from wedging. Another advantage is that the spiral motion control unit allows the clamping jaws to cover a longer radial distance, thus allowing clamping of larger hubs. These advantages are reinforced utilizing a spiral of Archimedes.

In another preferred embodiment, the measuring sensors are brought into direct abutment with the hub or the brake disk. The advantage thereof is that, in contrast to the state of the art, the sensors will not perform indirect measurement but rather, in accordance with the invention, direct measurement. The advantage thereof is that by registering the data directly at the hub and/or at the brake disk the geometric data can be recorded without alteration, which leads to a much more precise result of the measurement.

The direct measurement of the wheel axle at its hub and/or brake disk further has the advantage that the values are measured directly at the wheel axle so that measurement errors as they may occur for example when the hub gripper is not coupled properly to the wheel axle are avoided. Further, possible measurement errors as they occur on component parts due to manufacturing tolerances are avoided since no foreign components are involved in the measurement as the measurement is performed directly at the wheel axle.

In an advantageous developed implementation, the measuring sensors are disposed substantially beside the hub gripper. The advantage thereof is that the sensors may thus be readily brought in proximity to the respective one of the measuring points on the hub or on the brake disk.

It has thereby been found advantageous to cause the sensors to be displaced in the longitudinal direction so that the hub gripper grasping and liberating the axle will not inadvertently damage the sensors.

Further advantages of the method of the invention, of the device of the invention and of the hub gripper of the invention will become apparent in the appended drawings and in the following description of embodiments thereof. Likewise, the invention lies in each and every novel feature or combination of features mentioned above or described herein after. The embodiments discussed herein are merely exemplary in nature and are not intended to limit the scope of the invention in any manner.

DETAILED DESCRIPTION OF THE INVENTION

Figure 1:
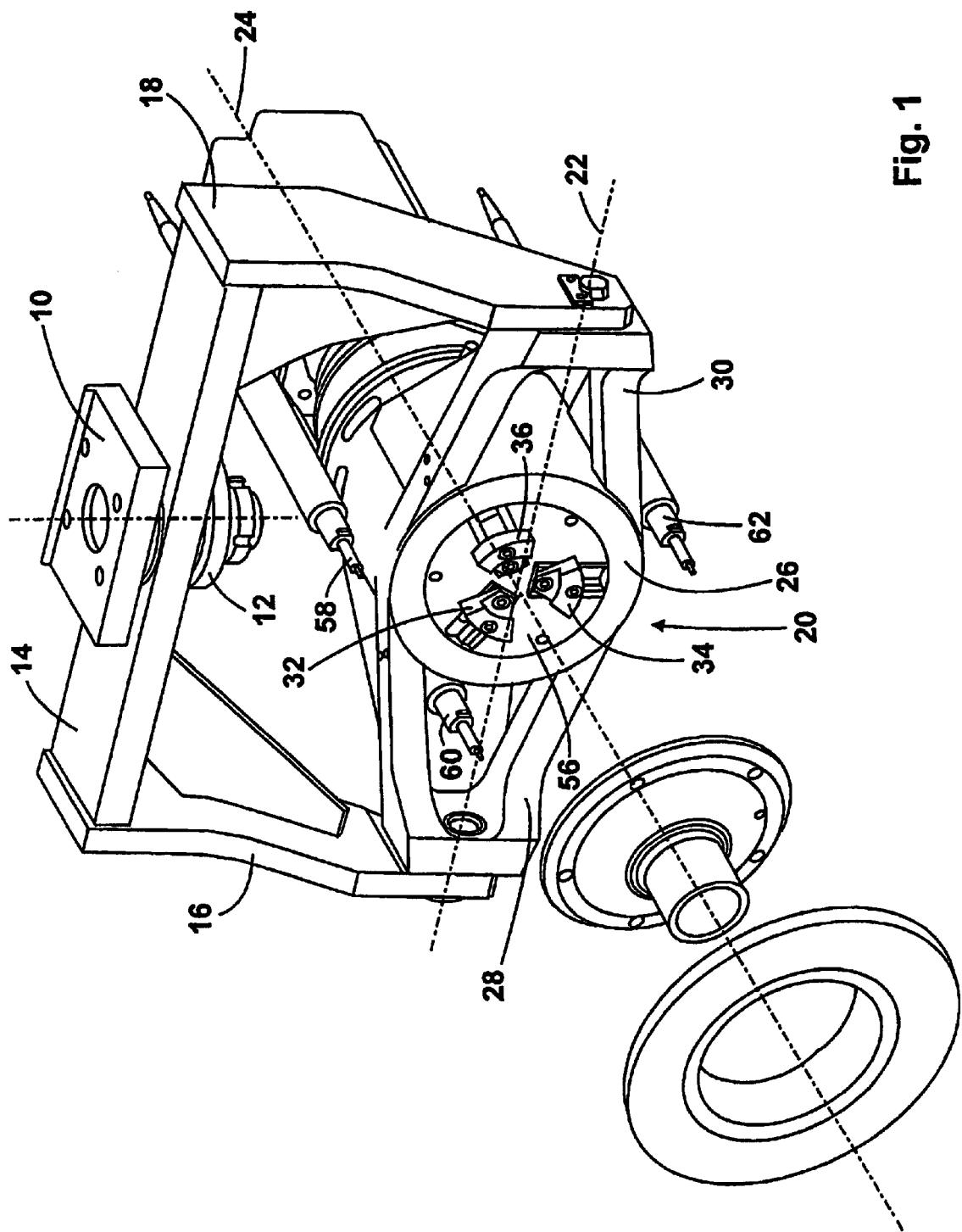
FIG. 1 is a schematic representation of the device of the invention in a perspective view.
Figure 2:
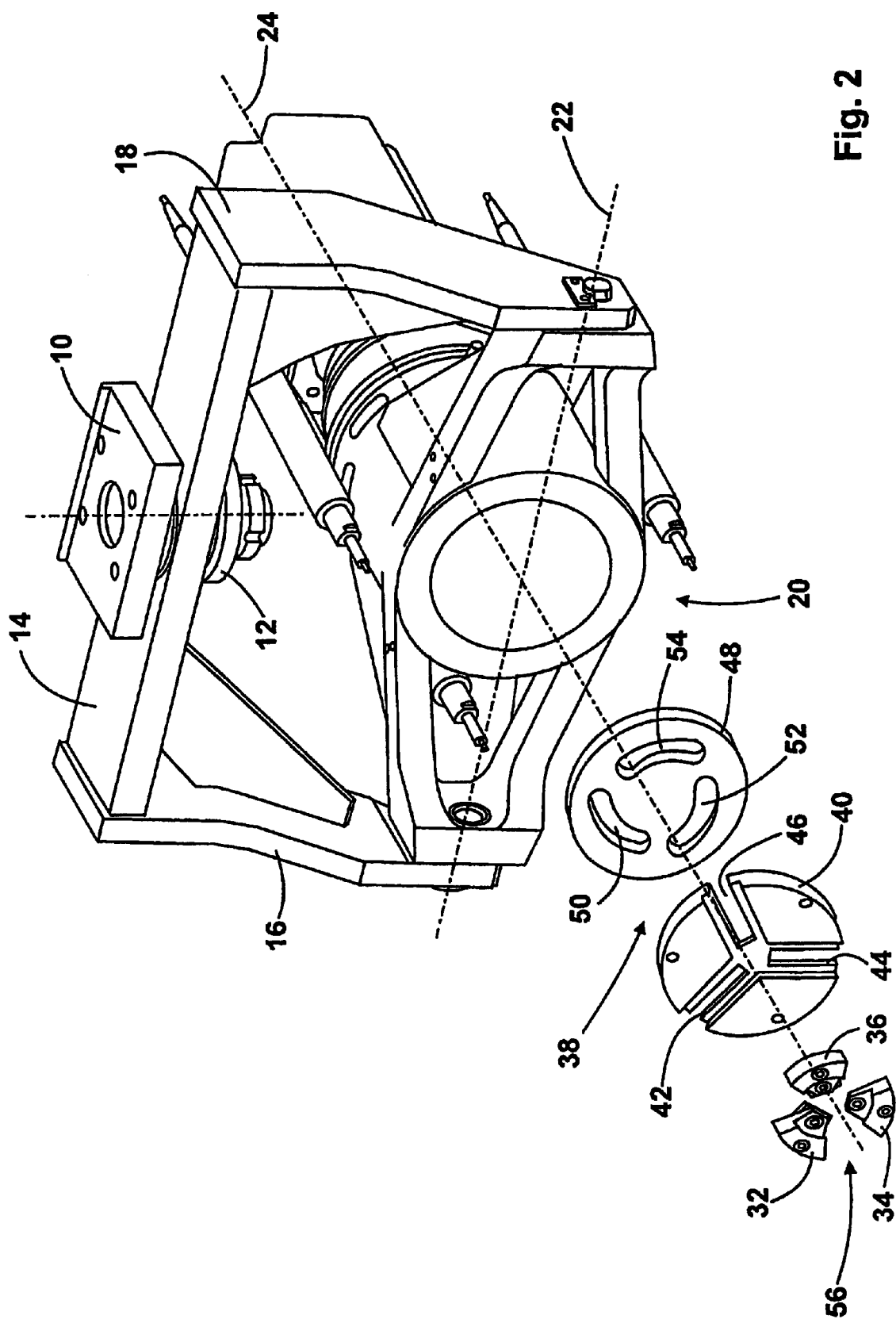
FIG. 2 is an exploded illustration of the device in accordance with FIG. 1.

In the FIGS. 1 and 2 there is illustrated a device of the invention for measuring the geometry of wheel axles of a motor vehicle, more specifically for measuring the toe angle and/or camber. This device serves to automatically measure industrially manufactured wheel axles. This means that during series manufacturing of new wheel axles for motor vehicles the camber and toe angle of the wheels is only roughly preset during assembly of the various component parts. For more precise setting of the camber and the toe angle, the wheel axle is positioned at a defined position on the assembly line and the device for measuring the geometry of the wheel axle is fully automatically brought in proximity to the hub of the wheel axle. The toe angle and camber values are thereby advantageously obtained taking into consideration the wobbling of the hub or of the brake disk.

At need, a second device for measuring the geometry of the wheel axle can be brought in proximity to the second wheel hub so that the two sides of the axle may be measured and set simultaneously.

The device for measuring the geometry of wheel axles of a motor vehicle illustrated in the FIGS. 1 and 2 includes a receptacle 10 that is float mounted on a post (not shown) and is hinge-linked with a vertically oriented pivot hinge 12 to a substantially U-shaped retaining arm 14. A hub gripper 20 is attached to two legs 16, 18 of the retaining arm 14. In contrast to the vertically rotatable pivot hinge 12, the hub gripper 20 is retained in the retaining arm 14 so as to be horizontally pivotable with a pivot axis 22 intersecting a longitudinal axis 24 of the hub gripper 20. The pivot axis 22 extends through the plane of the clamping jaws 32, 34, 36 in which the forces are introduced. Forces may thus be induced without torque.

The hub gripper 20 includes a body 26 that is pivotally attached to the legs 16, 18 of the retaining arm 14 via supporting arms 28, 30. In the body 26, three clamping jaws 32, 34, 36 are evenly spaced about the longitudinal axis 24 and are carried so as to be radially displaceable. The clamping jaws 32, 34, 36 are thereby displaced radially through a link motion 38 so that they are allowed to grasp and retain the hub.

The link motion includes a guide disk 40 with three evenly spaced radially extending slots 42, 44, 46 and an eccentric plate 48 with three curved long holes 50, 52, 54, said long holes 50, 52, 54 being disposed so that one end is relatively near the longitudinal axis 24 with the distance from the longitudinal axis 24 increasing toward the other end of a respective one of the long holes. Put another way, the long holes 50, 52, 54 are disposed eccentrically about the longitudinal axis 24 so that self-locking is achieved in the clamping point.

As far as the link motion control unit 38 is concerned, a certain slot 42, 44, 46 and a certain long hole 50, 52, 54 is associated with a clamping jaw 32, 34, 36 with each clamping jaw 32, 34, 36 extending through the associated slot 42, 44, 46 into the corresponding long hole 50, 52, 54 so that, when the eccentric plate 48 is caused to rotate accordingly, the clamping jaws 32, 34, 36 are caused to moved evenly radially outward or inward, thus being capable of grasping and retaining the hub.

The link motion control unit 38, and the eccentric plate 48 in particular, are driven by a servomotor that has not been illustrated in further detail herein. The clamping chuck 56, including the clamping jaws 32, 34, 36 and the link motion control unit 38 are caused to rotate about the longitudinal axis 24 by this servomotor, more specifically in order to measure the wobble on the wheel axle. A switchable coupling (not shown), which is also driven by the servomotor, is provided between servomotor and clamping chuck 56.

The servomotor is capable of reproducing the momentary angular position of the clamping chuck and, as a result thereof, also the momentary adjusted position of the axle or of the hub so that possible unbalance occurring during wobble measurement can be accurately localized.

The link motion control unit 38 is designed to be self-locking in order to prevent the clamping jaws 32, 34, 36 from being displaced. Utilizing the link motion control unit 38 to actuate the clamping chuck 56 allows making the hub gripper so small that the outer diameter of the body 26 of the hub gripper 20 is smaller than the outer diameter of a hub of the wheel axle to be measured. As a result, the measuring sensors 58, 60, 62 needed for measurement may be mounted beside the body 26 and may still directly access the hub.

Figure 3:
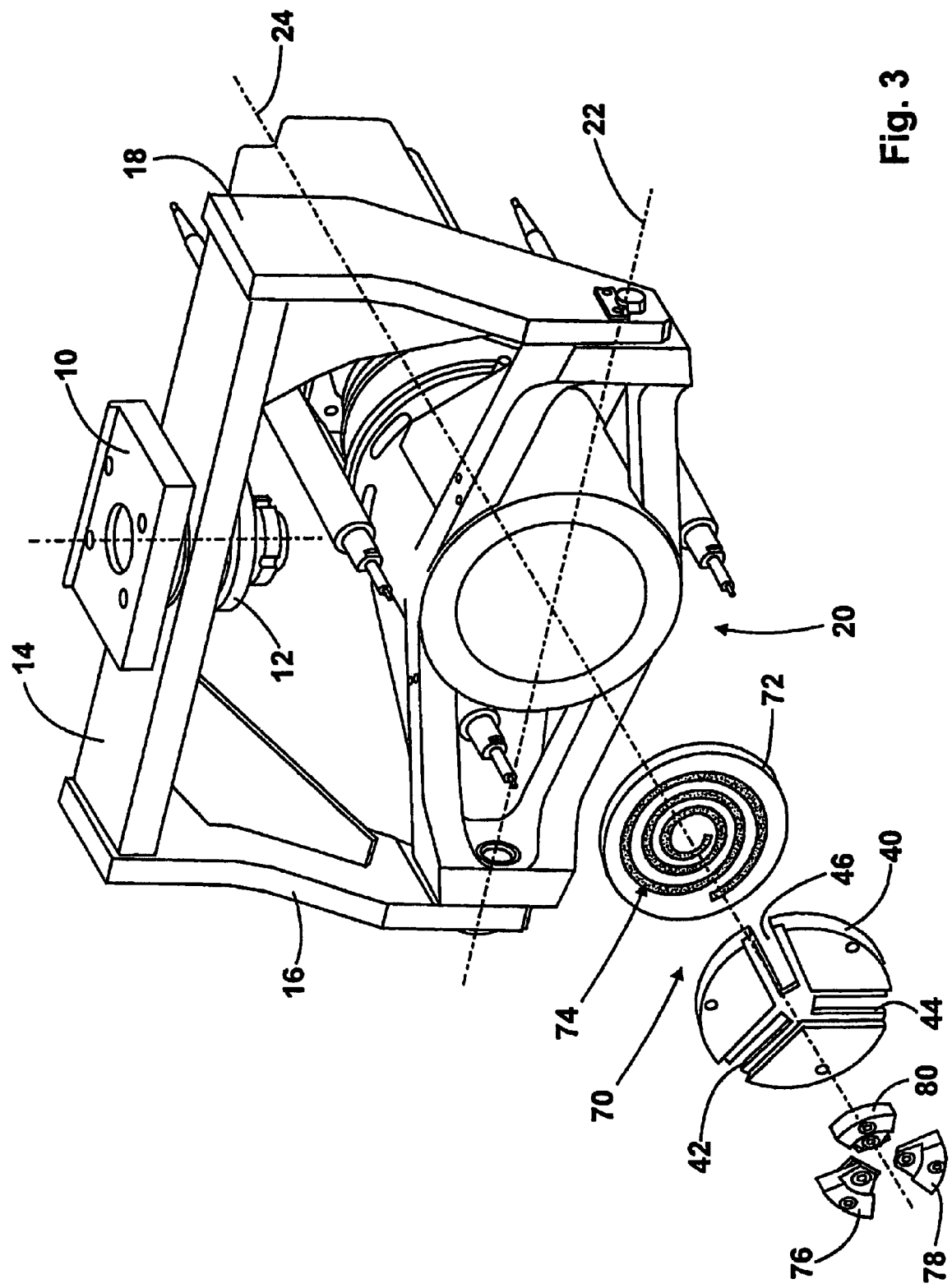
FIG. 3 is a schematic, exploded view of a second embodiment of a device of the invention.

In a second embodiment illustrated in FIG. 3, the link motion of the clamping chuck is replaced by a spiral motion 70. The eccentric plate 72 thereby comprises a groove 74 in the shape of a spiral of Archimedes, driver members attached to the rear side of the clamping jaws 76, 78, 80 extending through the slots 42, 44, 46 of the guide disk 40 into the groove 74 of the eccentric plate 72 so that the clamping jaws 76, 78, 80 are radially displaced upon rotation of the eccentric plate 72. It should be understood that the driver members of the clamping jaws 76, 78, 80 are thereby offset in such a manner that all the clamping jaws 76, 78, 80 are always spaced the same distance from the longitudinal axis 24 even if the discrete clamping jaws 76, 78, 80 engage the spiral-shaped groove 74 at different places.

The method for measuring the geometry of wheel axles of motor vehicles will be explained herein after:

Once the industrially manufactured wheel axle has been brought to the station for measurement, the hub gripper is roughly brought into the position of the one wheel hub. The hub gripper 20 is thereby pivotal both about a vertical and about a horizontal axis so that the hub gripper 20 is allowed to grasp the hub in such a manner that the longitudinal axis 24 of the hub gripper 20 is aligned with the central axis of the hub. As soon as the hub gripper 20 has reached the desired position, the hub gripper 32, 34, 36 of the clamping chuck 56 is actuated. A coupling that has not been illustrated herein at first is switched to bring the servomotor in direct contact with the clamping chuck 56, next the servomotor rotates the eccentric plate 48 so that the clamping jaws 32, 34, 36 are caused to move through the long holes 50, 52, 54 and the slots 40, 42, 46 toward the longitudinal axis 24 and to grasp the hub. As the link motion control unit 38 is configured to be self-locking, the clamping jaws 32, 34, 36 now remain in their position and reliably retain the hub of the wheel axle. Now, the coupling is switched and the servomotor rotates the clamping chuck 56 about the longitudinal axis 24, also causing thereby the hub to rotate. Now, the measuring sensors 58, 60, 62 are deployed until they abut on the hub and are capable of measuring same. Measurement is performed taking thereby the wobble into consideration.

Once the measurement has been performed, the entire procedure is performed in reverse and the clamping chuck is separated from the hub so that the next wheel axle can be brought into position for measurement.

It should be understood that, depending on the application, a brake disk may also be present on the wheel axle and that at need the measuring sensors may be brought in proximity to the brake disk in similar fashion in order to measure the wheel axle through the brake disk.

LIST OF NUMERALS 10 receptacle
12 pivot hinge
14 retaining arm
16 leg
18 leg
20 hub gripper
22 pivot axis
24 longitudinal axis
26 body
28 supporting arm
30 supporting arm
32 clamping jaw
34 clamping jaw
36 clamping jaw
38 link motion control unit
40 guide disk
42 slot
44 slot
46 slot
48 eccentric plate
50 long holes
52 long holes
54 long holes
56 clamping chuck
58 measuring sensor
60 measuring sensor
62 measuring sensor
70 spiral motion control unit
72 eccentric plate
74 groove
76 clamping jaw
78 clamping jaw
80 clamping jaw

We claim:

1. A device for measuring the geometry of a wheel axle of a motor vehicle, with a clamping chuck (56) comprising clamping jaws (32, 34, 36) for receiving a hub of the wheel axle, with a drive for rotating the clamping chuck (56),
   characterized in that the drive is configured to be an electric drive, more specifically a servomotor, and both rotatably drives the clamping chuck (56) and actuates the clamping jaws (32, 34, 36) of the clamping chuck (56) in the radial direction.

2. The device as set forth in claim 1,
   characterized in that the electric drive is disposed axially centrally behind the clamping chuck (56).

3. A device for measuring the geometry of a wheel axle of a motor vehicle, with a clamping chuck (56) comprising clamping jaws (32, 34, 36, 76, 78, 80) for receiving a hub of the wheel axle, with a drive for rotating the clamping chuck (56),
   characterized in that the clamping jaws (32, 34, 36, 76, 78, 80) are radially movable through a link motion control unit (38) or through a spiral motion control unit (70), with the link motion control unit (38) and the spiral motion control unit (70) being actuatable through an electric drive.

4. The device as set forth in claim 3,
   characterized in that the link motion control unit (38) or the spiral motion control unit (70) is self-locking.

5. The device as set forth in claim 3,
   characterized in that the spiral motion control unit (70) comprises a spiral of Archimedes.

6. The device as set forth in claim 3,
   characterized by at least one, preferably three, measuring sensors (58, 60, 62), at least one measuring sensor (58, 60, 62) being brought into abutment with a brake disk and/or with the hub during measurement.

7. The device as set forth in claim 6,
   characterized in that the at least one measuring sensor (58, 60, 62) is substantially disposed beside the hub gripper (20).

8. The device as set forth in claim 6,
   characterized in that the at least one measuring sensor (58, 60, 62) is retained so as to be movable in the longitudinal direction.

* * * * *